United States Patent [19]

Yumura et al.

[11] Patent Number: 4,862,441
[45] Date of Patent: Aug. 29, 1989

[54] CARRIAGE ASSEMBLY

[75] Inventors: Takashi Yumura; Tetsu Yamamoto, both of Amagasaki, Japan

[73] Assignee: Mitsubishi Denki Kabushiki Kaisha, Japan

[21] Appl. No.: 53,636

[22] Filed: May 26, 1987

[30] Foreign Application Priority Data

May 27, 1986 [JP] Japan .................. 61-120074
May 27, 1986 [JP] Japan .................. 61-120075

[51] Int. Cl.$^4$ .................................... G11B 7/095
[52] U.S. Cl. ........................ 369/45; 369/220
[58] Field of Search ................. 369/44–46, 369/220, 221, 222; 310/12, 13; 250/201 DF; 350/6.3, 255

[56] References Cited

U.S. PATENT DOCUMENTS

| | | | |
|---|---|---|---|
| 4,321,701 | 3/1982 | Arquie et al. | 369/45 |
| 4,414,657 | 11/1983 | Arquie et al. | 369/45 |
| 4,443,721 | 4/1984 | Jansen | 310/14 |
| 4,545,046 | 10/1985 | Jansen et al. | 369/44 |
| 4,583,212 | 4/1986 | Koide et al. | 369/221 |

*Primary Examiner*—Donald McElheny, Jr.
*Attorney, Agent, or Firm*—Leydig, Voit & Mayer

[57] ABSTRACT

A carriage assembly for use with an optical recording disc for optical recording and reproduction relative to the disc comprises a frame, an optical lens for projecting and receiving a light beam for the optical recording and reproduction, a carriage movably supported in the frame for supporting the optical lens relative to the disc, a vertical guide arrangement for permitting a movement of the optical lens relative to the carriage in a vertical direction relative the disc surface, a vertical drive arrangement for driving the optical lens in the vertical direction relative to the carriage, a radial guide arrangement for permitting said carriage to move in a radial direction of said optical disc, and a radial drive arrangement for driving the carriage in the radial direction of the disc. The vertical drive arrangement includes a permanent magnet and an electromagnetic coil electromagnetically coupled with the permanent magnet, one of the permanent magnet and the electromagnetic coil being mounted to the optical lens and the other of them being mounted to the frame, whereby the carriage assembly is reduced in both weight and physical dimensions.

11 Claims, 6 Drawing Sheets

CARRIAGE ASSEMBLY

BACKGROUND OF THE INVENTION

This invention relates to a carriage assembly for use with an optical recording disc for positioning an optical lens for optical recording and reproduction relative to the disc.

FIGS. 1 and 2 illustrate, in perspective, an example of a conventional carriage assembly for use in an optical disc apparatus.

Such a conventional carriage assembly comprises a frame 1, an optical lens 2 for projecting and receiving a light beam for the optical recording and reproduction relative to an optical disc 3 which rotates about a shaft 3a, and a carriage 4 movably supported in the frame 1. The carriage 4 comprises a translating member 4a of substantially rectangular cross-section having a data converter unit (not shown) incorporated therein, and a pickup assembly 4b mounted on one end portion of the translating member 4a, the pickup assembly having mounted the objective lens 2 thereon. The assembly further includes a radial guide arrangement 7 for permitting the carriage 4 to move in a radial direction relative to the disc 3. The radial guide arrangement 7 comprises linear bearings 8 mounted on both sides of the translating member 4a of the carriage 4 and a pair of guide rails 9 secured to the frame 1 in a parallel relationship with respect to each other in the radial direction of the disc 3. The linear bearings 8 engage the guide rails 9 such that the carriage 4 moves along the guide rails 9. The carriage assembly further comprises a radial drive arrangement 10 including an electromagnetic coil 11 secured to the translating member 4a of the carriage 4 and a pair of magnetic circuits 12. Each of the magnetic circuits 12 comprises an outer stator yoke 13 of a magnetic material having a substantially U-shaped horizontal cross section, a permanent magnet 14 disposed in an inner side of the bight portion of the U-shaped outer stator yoke 13 and a center pole piece 15 connected to the ends of the leg portions of the U-shaped outer stator yoke 13, through which a magnetic flux flows. The magnetic circuits 12 are electromagnetically coupled with the electromagnetic coil 11. The optical lens 2, the carriage 4, the linear bearings 8 and the electromagnetic coil 11 together constitute a moving unit. The guide rails 9, and the magnetic circuits 12 comprising the U-shaped yokes 13, the permanent magnets 14 and the center pole pieces 15 together constitute a stationary unit.

Referring now to FIG. 2, the pickup assembly 4b includes a vertical drive arrangement 20 and a radial drive arrangement 30 for positioning the optical lens 2 at a desired position on the optical disc 3 to project light beam thereon.

The vertical drive arrangement 20 comprises a cylindrical stator yoke 21, a cylindrical stator permanent magnet 22 mounted on the cylindrical stator yoke 21 with a predetermined gap therebetween, a cylindrical drive coil 23 movably mounted between the cylindrical stator yoke 21 and the magnet 22, a rod 26, one end of which is fixed to the center of the stator yoke 21 and the other end coaxially extending centrally upwards through the cylindrical stator permanent magnet 22 and the cylindrical drive coil 23, a sub cylindrical stator yoke 21a which is coaxially mounted on the stator magnet 22, a sleeve 25 slidably mounted on the rod 26, a turn-table 24, having mounted the optical lens 2 thereon, connected at the center thereof to the upper end of the sleeve 25, and a stopper plate 27, connected to the other end of the rod 26, provided for preventing the turn-table 24 from coming off the rod 26.

The radial drive arrangement 30 comprises a pair of radial drive coils 31 mounted on peripheral edges of the turn-table 24 in an opposite relationship with respect to each other, and a pair of stator permanent magnets 32 disposed on the sub cylindrical stator yoke 21a in the vicinity of the respective radial drive coils 31 through plates 33 of a non-magnetic material. Each of the radial drive coils 31 is electromagnetically coupled with a correspondiing stator permanent magnet 32, a pair of springs 34 disposed between the turn-table 24 and the optical lens 2 so as to maintain the lens 2 at a predetermined position.

When the electromagnetic coil 11 is energized in accordance with a command from an external control unit (not shown), a magnetic field is generated around the electromagnetic coil 11. The magnetic field generates a driving force in cooperation with the magnetic flux flowing through the respective center pole pieces 15 as defined by Fleming's rule, whereby the carriage 4 together with the objective lens 2 is moved in the direction indicated by an arrow A or A' shown in FIG. 1, i.e. in the radial direction of the disc 3. The objective lens 2 mounted on the pickup assembly 4b is arranged so as to be movable in the radial direction and/or in the vertical direction of the disc 3 along the optical axis thereof by means of the vertical drive arrangement 20 and the radial drive arrangement 30 respectively, thereby allowing the light beam projected from the objective lens 2 to be positioned at a desired position on the disc surface.

When recording or reproducing function is to be performed, first the objective lens 2 is approximately positioning over a desired area on the disc 3 by regulating the current supplied to the electromagnetic coil 11. Once the lens 2 is positioned over the desired area of the disc 3, the current supplied to the electromagmetic coil 11 is cut off, whereby the driving force ceases. Then, the objective lens 2 is moved in the radial and/or perpendicular directions of the disc 3 by means of the vertical drive arrangement 20 and the radial drive arrangement 30, by controlling the current flowing through the electromagnetic coils 31 and the cylindrical electromagnetic coil 23, respectively, so that the light beam projected through the objective lens 2 is precisely positioned at a desired position on the disc surface.

The thus-constructed conventional carriage assembly has problems in that, in order to position the objective lens 2 at a desired position over the disc surface, the pickup assembly 4b must have a vertical drive arrangement 20 for driving the objective lens 2 in the vertical direction of the disc 3 to adjust the focus of the lens 2 and a radial drive arrangement 30 for moving the objective lens 2 in the radial direction of the disc 3 by the diametrical movement of the turn-table 24 of the pickup assembly 4b. Accordingly, the carriage assembly is both cumbersome and weighty and the moving speed of the carriage 4 cannot be increased, resulting in a reduced access time of the objective lens 2. The physical dimensions of the moving unit are large, so it becomes difficult for the carriage assembly to be made compact. Further, the magnetic circuit 12, which comprises the outer stator yoke 13, the permanent magnet 14 and the center pole piece 15, has no magnetic flux path in the vertical direction, so magnetic flux leaks out in the vertical direction.

SUMMARY OF THE INVENTION

Accordingly, an object of this invention is to provide a carriage assembly free from the above discussed problems.

Another object of this invention is to provide a carriage assembly whose physical dimensions are reduced.

Still another object of this invention is to provide a carriage assembly whose structure is simplified in comparison to that of the conventional carriage assembly.

Still another object of this invention is to provide a carriage assembly in which the weight of a carriage is reduced, whereby the access time is reduced.

Still another object of the invention is to provide a more compact carriage assembly in which the number of components is reduced.

According to this invention, a carriage assembly for use with an optical recording disc comprises a frame, an optical lens for projecting and receiving a light beam for optical recording and reproduction, and a carriage movably supported in the frame and supporting the optical lens for movement in a radial direction relative to the disc. The assembly further comprises vertical guide means for permitting movement of the optical lens relative to the carriage in a vertical direction relative to the disc surface, vertical drive means for driving the optical lens in the vertical direction, radial guide means for permitting the carriage to move in a radial direction relative to the optical disc, and radial drive means for driving the carriage in the radial direction. The vertical drive means includes a permanent magnet and an electromagnetic coil electromagnetically coupled with the permanent magnet, one of the permanent magnet and the electromagnetic coil being mounted to the optical lens and the other of them being mounted to the frame.

BRIEF DESCRIPTION OF THE DRAWINGS

This invention will become more readily apparent from the following detailed description of the preferred embodiments of this invention taken in conjunction with the accompanying drawings, in which.

DETAILED DESCRIPTION OF THE PREFERRED EMBODIMENT

Figure 1:
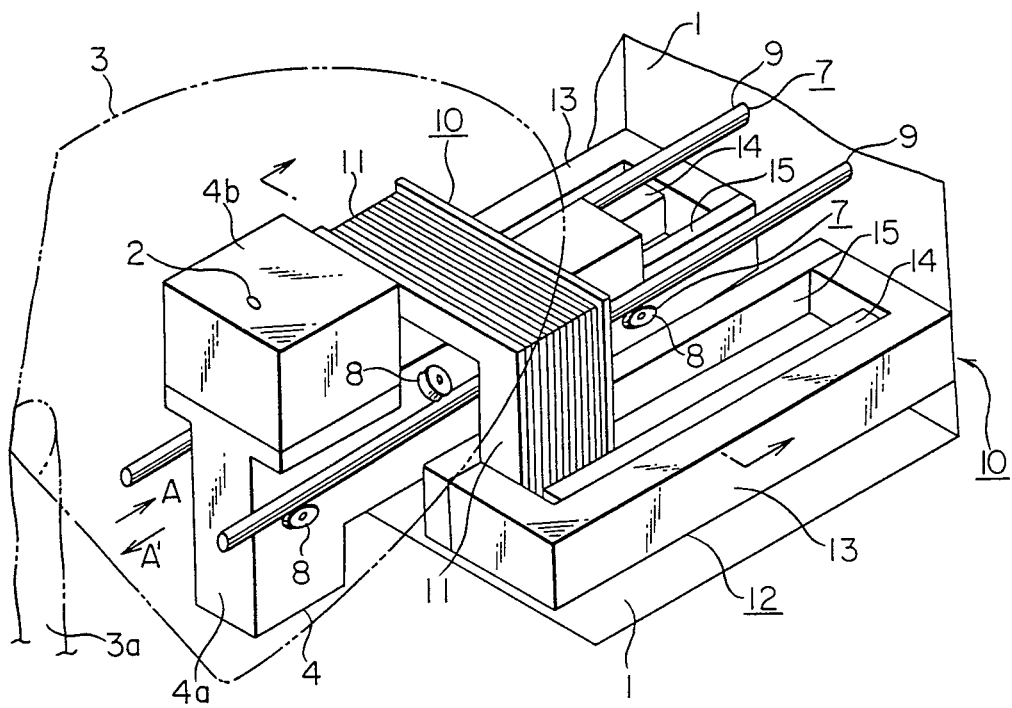
FIG. 1 is a perspective view of a conventional carriage assembly.
Figure 2:
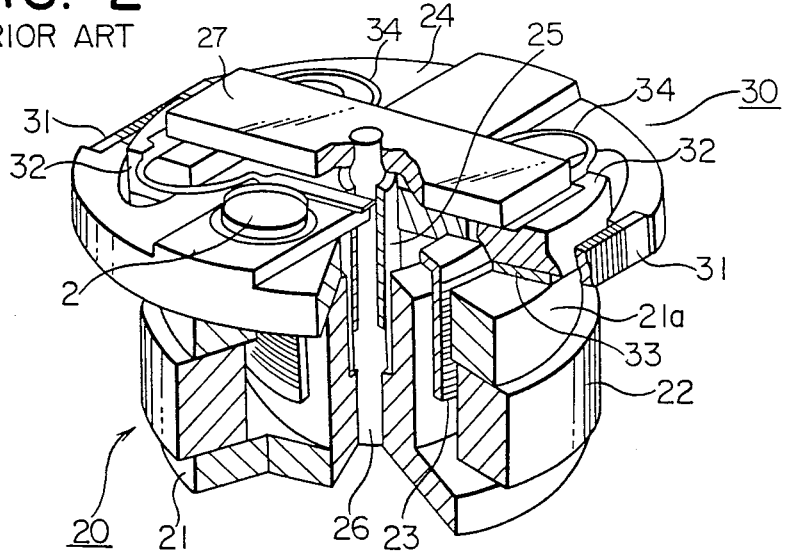
FIG. 2 is a perspective view of a pickup assembly used in the conventional carriage assembly.
Figure 3:
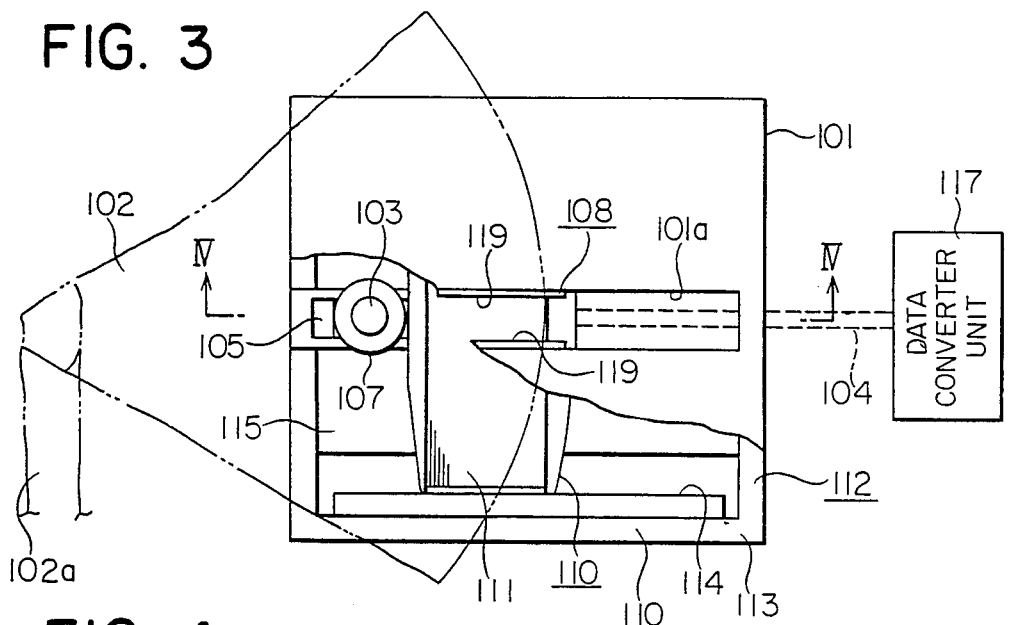
FIG. 3 is a plan view, partly cut away, of a carriage assembly according to an embodiment of this invention.
Figure 4:
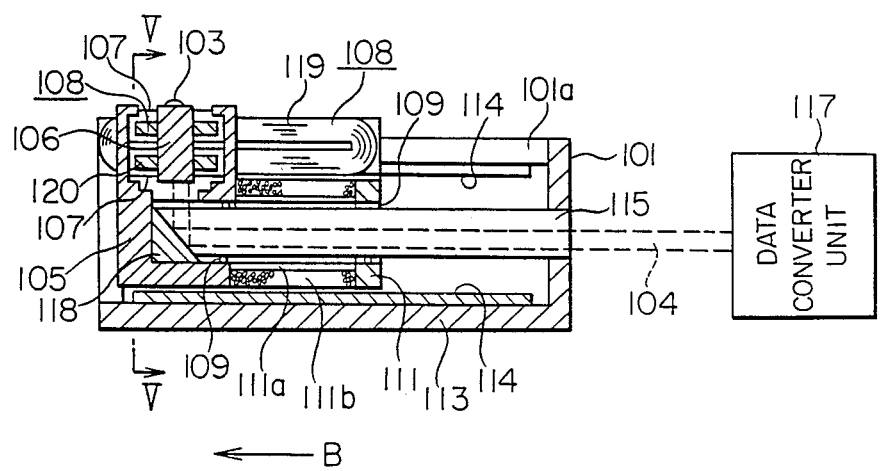
FIG. 4 is a cross sectional side view taken along line IV—IV in FIG. 3.
Figure 5:
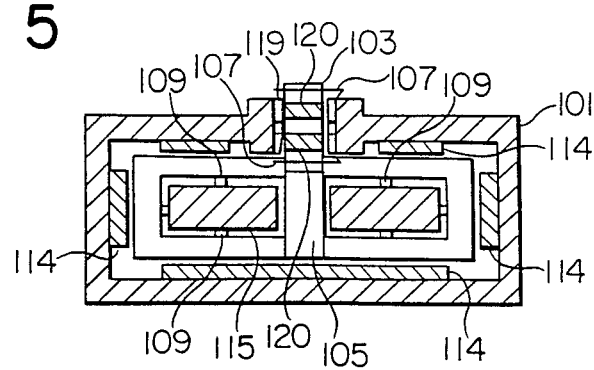
FIG. 5 is a cross sectional front view taken along line V—V in FIG. 4.
Figure 6:
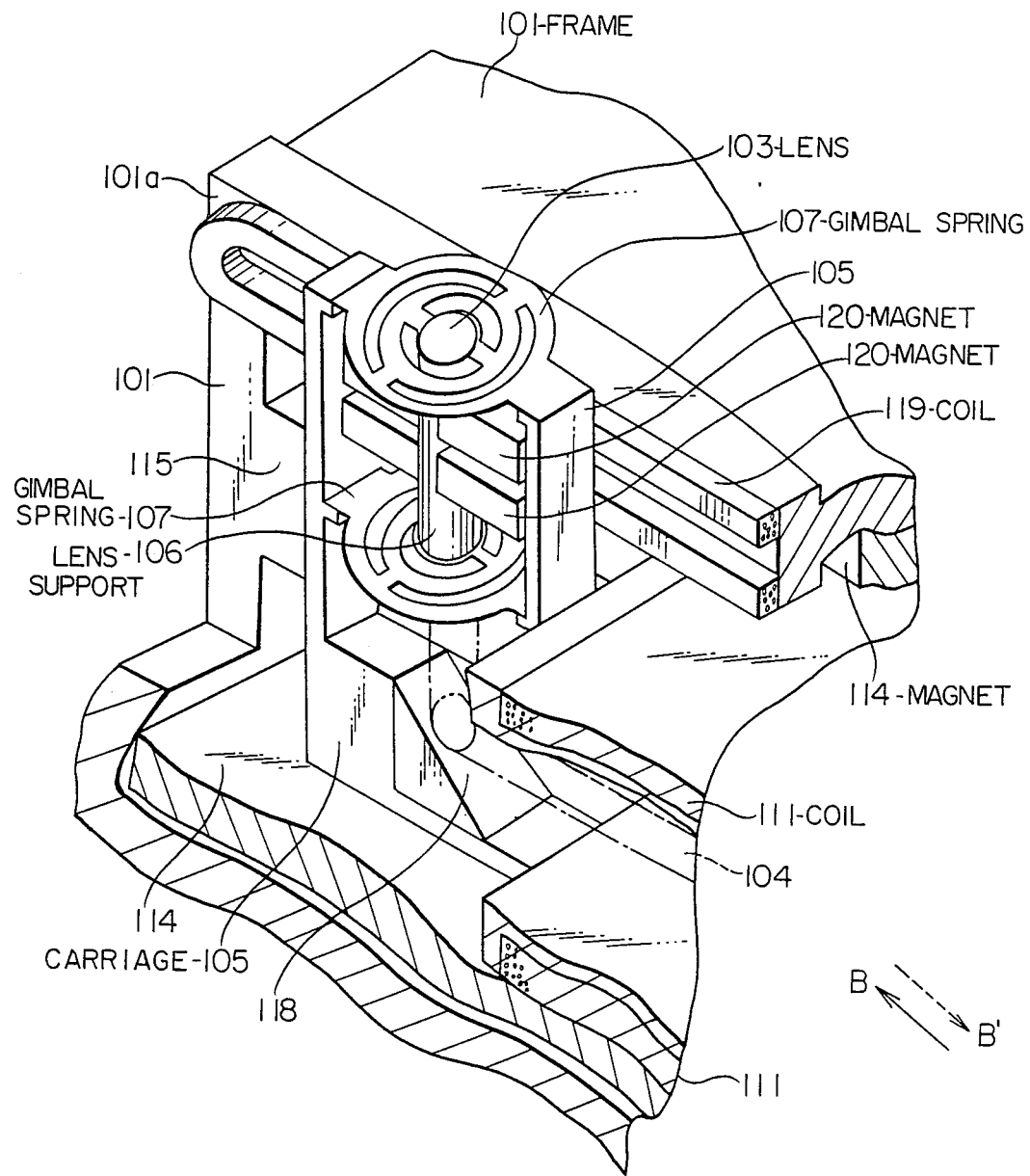
FIG. 6 is a perspective view, partly cut away, of the carriage assembly shown in FIG. 3.
Figure 7:
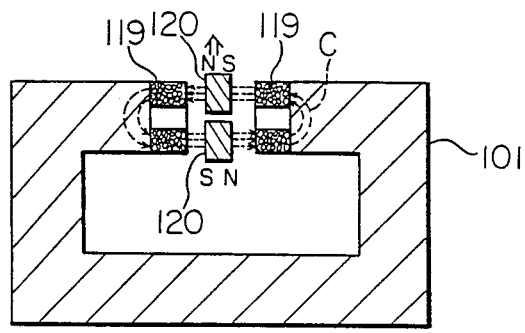
FIG. 7 is a schematic view of a principal part of the carriage assembly shown in FIG. 3.

Referring to FIGS. 3 to 7, the carriage assembly of this invention comprises a box shaped frame 101 of a magnetic material, having an elongated slot 101a formed in the top wall thereof and extending in the radial direction of an optical disc 102 which rotates about a shaft 102a. The assembly further comprises an optical lens 103 for projecting and receiving a light beam 104 for the optical recording and reproduction, and a carriage 105 movably supported in the frame 102 for supporting the optical lens 103 relative to the optical disc 102. The optical lens 103 is mounted on a cylindrical lens support 106. Vertical guide means such as a pair of gimbal springs 107 for permitting a movement of the optical lens 103 relative to the carriage 105 in the vertical direction of the carriage 105 and the disc surface. One of the gimbal springs 107 is disposed between one end of the lens support 106 and the carriage 105 and the other is disposed between the other end of the lens support 106 and the carriage 105.

The carriage assembly further comprises vertical drive means such as a vertical drive arrangement 108 for driving the optical lens 103 in the vertical direction relative to the carriage 103. The vertical drive arrangement 108 comprises first electromagnetic coils 119 and first permanent magnets 120 electromagnetically coupled with the electromagnetic coils 119. The first electromagnetic coils 119 are mounted on opposite side walls of the elongated slot 101a and the first permanent magnets 120 are secured to the lens support 106, as better shown in FIG. 6.

The carriage assembly further comprises radial guide means such as bearings 109 for permitting the carriage 105 to move in the radial direction of the optical disc 102 and radial drive means such as a radial drive arrangement 110 for driving the carriage 105 in the radial direction of the disc 102. The radial drive arrangement 110 comprises a second electromagnetic coil 111 and a magnetic circuit 112 electromagnetically coupled with the second electromagnetic coil 111. The magnetic circuit 112 comprises a stator yoke 113 of a magnetic material which is a portion of the frame 101, second permanent magnets 114 secured to the stator yoke 113, and center pole pieces 115 secured to the stator yoke 113. The center pole pieces 115 are disposed with a predetermined space therebetween for forming a light beam path through which the light beam 104 passes. Thus, the second electromagnetic coil 111 and the magnetic circuit 112 together constitute a voice coil type linear motor. The light beam 104 is emitted from a data converter unit 117 to the disc surface through the objective lens 103 by reflecting it by a reflector 118 provided in the carriage 105. In the illustrated embodiment, the data converter unit 117 is disposed outside the carriage assembly. The optical lens 103, the lens support 106 and the first permanent magnets 120 provided in the carriage 105 together constitute a first moving unit. The carriage 105, the linear bearings 109 and the second electromagnetic coil 111 together constitute a second moving unit.

In the thus-constructed carriage assembly, when the second electromagnetic coil 111 is energized, a magnetic field is generated around the coil 111. The generated magnetic field of the coil 111 generates a driving force in cooperation with the magnetic flux flowing through the center pole pieces 115 to move the carriage 105 together with the objective lens 103 in the direction of an arrow B or B' in FIGS. 4 and 6, i.e. in the radial direction of the disc 102. Accordingly, by regulating the current supplied to the second electromagnetic coil 111, the movement of the carriage 105 with the lens 103 in the radial direction of the disc can be controlled. When the carriage 105 arrives at a desired position over the disc surface, the supply of the current to the second electromagnetic coil 111 is cut off, so that the driving force ceases. Then the objective lens 103 is moved in the vertical direction relative to the disc surface for adjusting the focus of the lens 103 by regulating the current supplied to the first electromagnetic coils 119, whereby the light beam 104 carrying data is focused at a desired position over the disc surface through the focusing lens 103, so that the recording and reproduction of the data on the disc surface can be carried out.

As can be seen from the above description, the carriage assembly according to this invention incudes a vertical drive arrangement 108 comprising the first electromagnetic coils 119 mounted on the frame 101 and the first permanent magnets 120 secured to the optical lens support 106 for driving the optical lens 103 in the vertical direction of the disc. Further, the linear bearings 109 are provided in the inner side of the second electromagnetic coil 111 and engage directly with the center pole pieces 115 without the need for the guide rails 9 of the conventional carriage assembly, i.e. the center pole pieces 115 are used as guide rails. Thus, since the coil 119 of the vertical drive arrangement 108 is mounted on the frame 101 and not to the lens support 106, the first moving unit including the lens 103, the lens support 106 and the first permanent magnets 120 is reduced in both weight and physical dimensions. Therefore, the resonant frequency of the first moving unit becomes high, so that the carriage can be positioned in the radial direction of the disc with precision by the voice coil type linear motor without the need for an additional fine adjustment device. The vertical drive arrangement 108 comprises the first electromagnetic coils 119 mounted to the elongated slot 101a and the first permanent magnets 120 secured to the lens support 106. The first permanent magnets 120 and the lens support 106 have a high rigidity and resonant frequency thereof is high, so that the optical lens 102 can be positioned with precision.

Further, the voice coil type linear motor can be made lighter than the radial drive arrangement 10 of the conventional carriage assembly, thereby providing better power consumption characteristics in comparison to that of the conventional carriage assembly.

Now, when the current flowing through the second electromagnetic coil is represented by $I_c$, the driving force constant by $K_f$, and the maximum moving speed of the second moving unit by v, the driving force $F_s$ of the voice coil type linear motor can be determined by the following equation:

$$F_s = K_f(I_c - K_f v) \ldots \quad (1)$$

When the current flowing through the second electromagnetic coil is represented by $I_c$, the weight by m, the time constant by $\tau_a$, the average moving speed by $T_{av}$ and the moving distance of the second moving unit by L, the driving force constant $K_f$ can be obtained by the following equation:

$$K_f = \frac{m}{I_c} \left( \frac{\tau_a}{T_{av}} \right)^2 L \quad (2)$$

If $K_f$, $\tau_a$, $T_{av}$ and L are in the same condition, the current $I_c$ flowing through the second electromagnetic coil is proportional to the weight m of the second moving unit. Accordingly, if the weight is reduced, the current $I_c$ and the driving force $F_s$ for driving the second moving unit can also be reduced.

When the current flowing through the second electromagnetic coil is represented by $I_c$ and the resistance of the coil by $R_c$, the power consumption P can be obtained by the following equation:

$$P = I_c^2 R_c \ldots \quad (3)$$

Accordingly, the power consumption becomes lower in proportion to the square of the current $I_c$ flowing through the coil. If the weight of the moving unit is reduced, the power consumption P can be reduced in proportion to the square of the weight m of the moving unit.

Although the second electromagnetic coil 111 includes a coil bobbin 111a and coil windings 111b wound around the coil bobbin 111a in the above embodiment, the coil windings may be wound directly around the carriage, thereby providing an even lighter and more compact moving unit, so that the weight and dimensions of the carriage assembly are further reduced.

Figure 8:
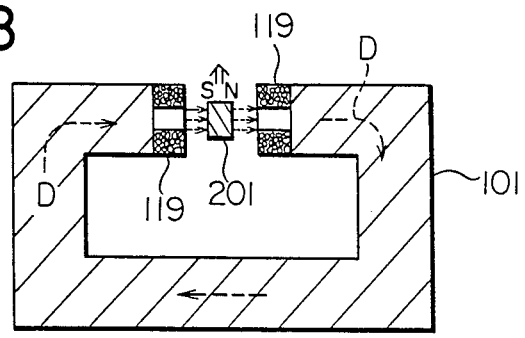
FIG. 8 is a schematic view of a principal part of the carriage assembly according to another embodiment of this invention.

As shown in FIG. 8, according to another embodiment, one permanent magnet 201 is secured to the lens support in place of two permanent magnets 120, thereby providing a magnetic path in the outer stator yoke 113 as indicated by an arrow D.

When it is required to reduce both the lateral and vertical dimentions of the carriage assembly, one of the first electromagnetic coils 119 and one of the first permanent magnets 120 are removed from the vertical drive arrangement 108.

Figure 9:
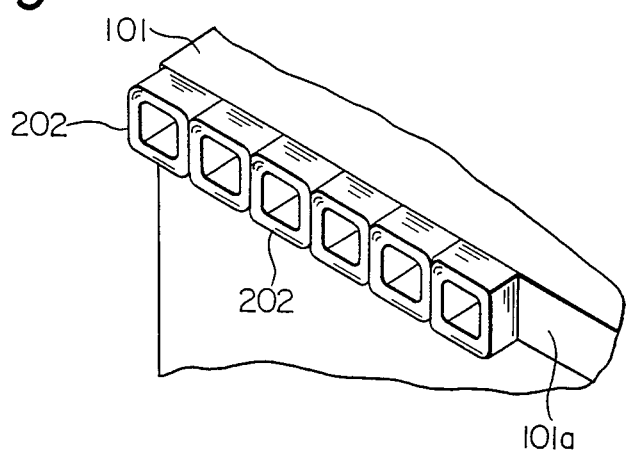
FIG. 9 is a perspective view of a principal part of the carriage assembly according to still another embodiment of the invention.

As shown in FIG. 9, according to still another embodiment, a plurality of electromagnetic coils 202 mounted in the elongated slot 101a in place of the first electromagnetic coils 119.

Figure 10:
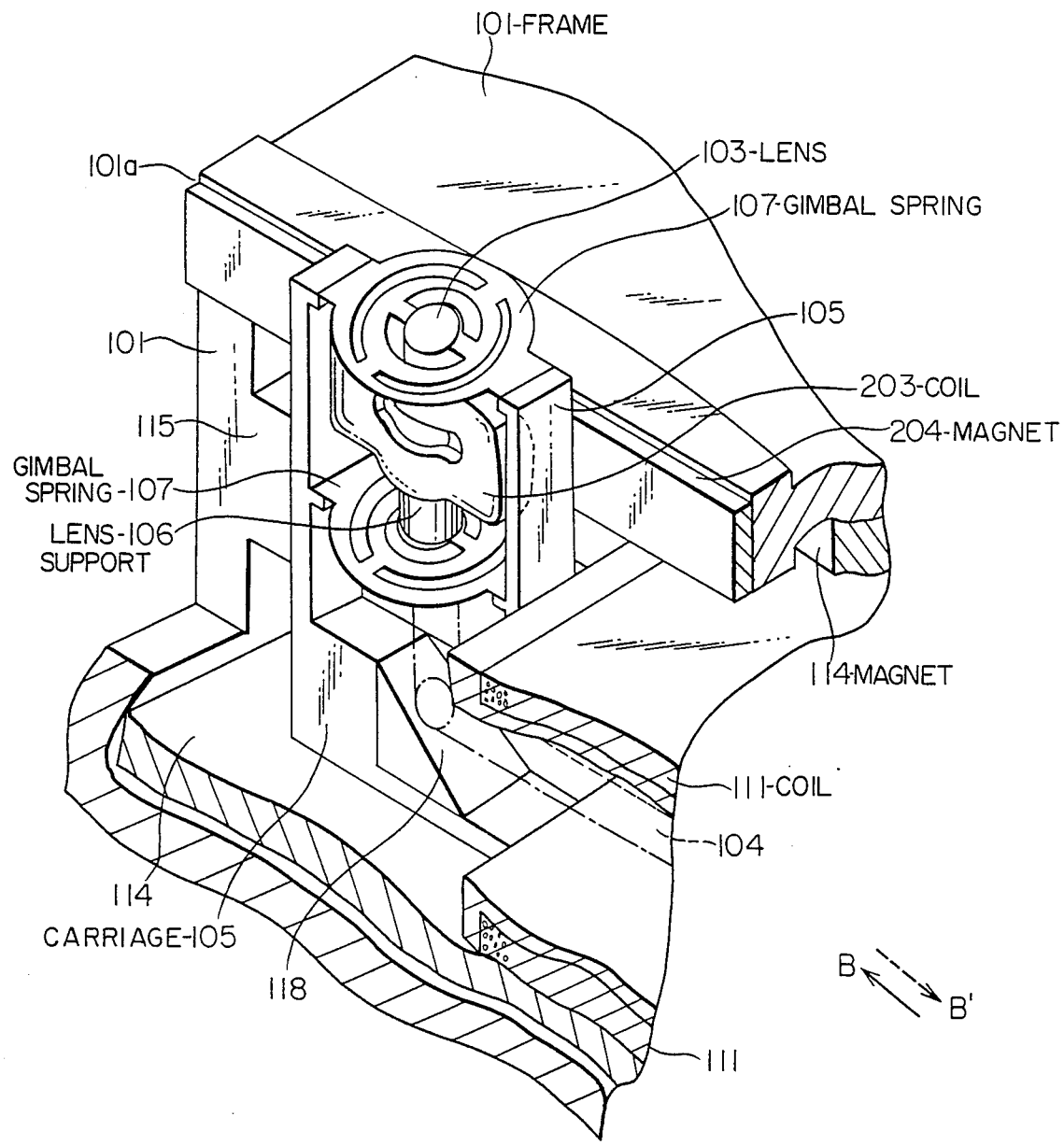
FIG. 10 is a perspective view, partly cut away, of the carriage assembly according to still another embodiment of this invention.
Figure 11:
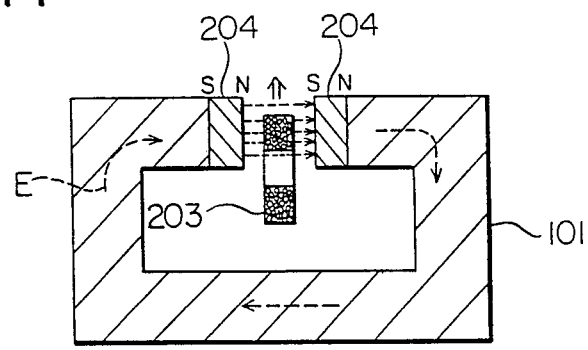
FIG. 11 is a schematic view of a principal part of the carriage assembly shown in FIG. 10.

As shown in FIGS. 10 and 11, according to still another embodiment, an electromagnetic coil 203 is mounted so as to surround the lens support 106, in place of the first permanent magnets 120, and permanent magnets 204 are mounted in the elongated slot 101a in place of the first electromagnetic coils 119, thereby providing a magnetic flux flowing in the direction indicated by an arrow E.

Figure 12:
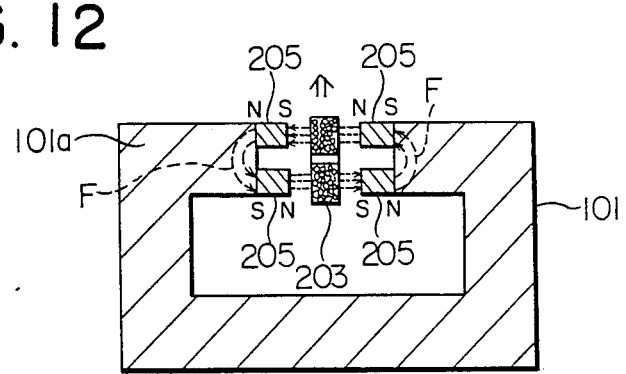
FIG. 12 is a schematic view of still another embodiment of this invention.

As shown in FIG. 12, according to still another embodiment, two pairs of permanent magnets 205 are mounted to the elongated slot 101a, thereby providing magnetic flux as indicated by an arrow F.

Figure 13:
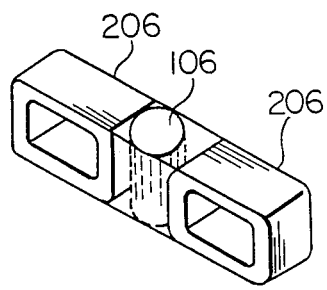
FIG. 13 is a perspective view of an electromagnetic coil which forms part of the vertical drive arrangement according to still another embodiment of this invention.

As shown in FIG. 13, according to still another embodiment, a pair of electromagnetic coils 206 are mounted on both sides of the lens support 106.

Figure 14:
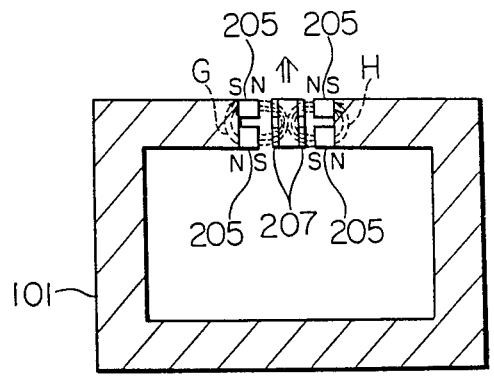
FIG. 14 is a schematic view of a principal part of the carriage assembly according to still another embodiment of this invention.

As shown in FIG. 14, according to still another embodiment, two pairs of electromagnetic coils 207 are mounted so as to surround the lens supports 106, thereby providing magnetic fluxes flowing in the directions as indicated by arrows G and H in cooperation with the permanent magnets 205.

It should be noted that, although the data converter unit 117 is disposed in the area outside of the carriage assembly in the embodiments as described above, it need not necessarily be so, and the data converter unit may be incorporated in any of a number of other ways, for instance, it may be incorporated in the carriage 105.

It should also be noted that, although a pair of gimbal springs 107 are provided for supporting the optical lens 103 in the above embodiments, any other type of support members may be used for supporting the lens 103, which provides a vertical movement to the lens 103.

As can be seen from the above description, according to this invention, the carriage assembly includes a vertical drive arrangement 108 for driving the optical lens 103 in the vertical direction of the disc and a radial drive arrangement 110 for driving the carriage in the radial direction of the disc. The vertical drive arrangement 108 includes the first permanent magnets 120 mounted on the carriage 105 and the first electromagnetic coils 119 mounted on the frame 101 in place of the pickup assembly 4b of the conventional carriage assembly, thereby allowing the size and weight of the first moving unit to be reduced, so that the physical dimension of the carriage assembly can be reduced, resulting in a low cost carriage assembly. The frame 101 is used as the outer stator yoke 113 and the gap formed between the center pole pieces 115 serves a light beam path, thereby allowing the carriage assembly to be made compact in comparison to the conventional carriage assembly. Further, the second electromagnetic coil 111 is disposed so as to be surrounded by the frame 101 of a magnetic material, thereby allowing the second electromagnetic coil 111 to be made compact. Besides, the magnetic flow leak is reduced by the frame 101 which is used as an outer stator yoke, resulting in a decrease in use of expensive permanent magnet.

What is claimed is:

1. A carriage assembly for use with an optical recording disc, said carriage assembly comprising:
    a box-shaped frame having walls of magnetic material surrounding an interior, said walls including a top wall having a narrow elongated slot located intermediate side walls of said frame, said top walls on opposite sides of said slot, said side walls and a bottom wall providing a closed magnetic circuit including the slot;
    an optical lens which projects and receives a light beam;
    a carriage movably supported in the interior of said frame and carrying said optical lens for movement parallel to the slot in a radial direction relative to an optical recording disc;
    vertical guide means including a lens support extending into the slot for guiding movement of said optical lens relative to said carriage in a vertical direction relative to a disc surface;
    vertical drive means for driving said lens support relative to said carriage in the vertical direction;
    radial guide means for guiding movement of said carriage in a radial direction relative to the optical disc; and
    radial drive means for driving said carriage relative to said frame in the radial direction, said radial drive means including a magnet and a coil electromagnetically coupled by flux in a closed magnetic circuit formed by walls of said frame surrounding said radial drive magnet and coil;
    said vertical drive means including a permanent magnet and an electromagnetic coil electromagnetically coupled with said permanent magnet by flux of the closed magnetic circuit, and one of said permanent magnet and said electromagnetic coil being mounted to said lens support in the slot and the other of them being mounted to said frame in the slot.

2. A carriage assembly as claimed in claim 1 wherein said vertical guide means is a support member mounted to said carriage for resiliently supporting said optical lens.

3. A carriage assembly as claimed in claim 1 wherein a wall of said frame facing the disc surface has a slot elongated in the radial direction of the disc.

4. A carriage assembly as claimed in claim 3 wherein siad vertical drive means includes an electromagnetic coil mounted to said frame along the elongated slot and a permanent magnet mounted to said optical lens.

5. A carriage assembly as claimed in claim 3 wherein said vertical drive means includes a permanent magnet mounted to said frame along the elongated slot and an electromagnetic coil mounted to said optical lens.

6. A carriage assembly as claimed in claim 3 wherein said vertical drive means includes a permanent magnet mounted to said optical lens and a plurality of electromagnetic coils mounted to said frame along the elongated slot.

7. A carriage assembly as claimed in claim 3 wherein said vertical drive means includes an electromagnetic coil mounted to said optical lens and a plurality of permanent magnets mounted to said frame along the elongated slot.

8. A carriage assembly as claimed in claim 3 wherein said vertical drive means includes an electromagnetic coil mounted to said frame along the elongated slot and a plurality of permanent magnets mounted to said optical lens.

9. A carriage assembly as claimed in claim 3 wherein said vertical drive means includes a permanent magnet mounted to said frame along the elongated slot and a plurality of electromagnetic coils mounted to said optical lens.

10. A carriage assembly for use with an optical disc, said carriage assembly comprising:
    (a) a frame for mounting in proximity to a surface of an optical disc, said frame being box-shaped and having walls of magnetic material surrounding an interior, said walls including a top wall facing the disc surface and having a narrow slot elongated in the radial direction of the disc and located intermediate side walls of said frame, said top wall on opposite sides of the slot, said side walls and a bottom wall providing a closed magnetic circuit including the slot;
    (b) a carriage movably supported in the interior of said frame for movement along a first path in a radial direction of the disc parallel to the slot;

(c) a voice coil-type linear motor having radial drive components comprising a magnet and an electromagnetic coil;
  (i) one of said radial drive components being mounted on said frame in the interior thereof in proximity to the first path, and
  (ii) the other of said radial drive components being mounted on said carriage such that said walls of said frame surround said radial drive components and provide a magnetic yoke for flux coupling said radial drive components;
(d) a lens support movably supported on said carriage by a plurality of gimbal springs for movement in a direction perpendicular to the disc surface and disposed on said carriage so as to extend into the slot and carried by movement of said carriage along a second path parallel to and in alignment with the slot;
(e) a lens support drive magnet;
(f) a lens support drive coil, one of said lens support drive magnet and said lens support drive coil being mounted on said frame in the slot and the other being mountd on said lens support in the slot so as to be electromagnetically coupled by flux in the closed magnetic circuit including the slot to drive the lens support along the second path; and
(g) an optical lens mounted on said lens support which projects and receives a light beam from the surface of the disc.

11. A carriage assembly for use with an optical recording disc, said carriage assembly comprising:
a frame;
an optical lens which projects and receives a light beam for optical recording and reproduction;
a carriage movably supported in said frame and a carrying said optical lens for movement in a radial direction relative to an optical recording disc;
vertical guide means including a lens support for guiding movement of said optical lens relative to said carriage in a vertical direction relative to a disc surface;
a vertical drive means for driving said lens support relative to said carriage in the vertical direction;
radial guide means for guiding movement of said carriage in a radial direction relative to the optical disc; and
radial drive means for driving said carriage relative to said frame in the radial direction;
said vertical drive means including a permanent magnet and an electromagnetic coil electromagnetically coupled with said permanent magnet, and one of said permanent magnet and said electromagnetic coil being mounted to said lens support and the other of them being mounted to said frame wherein said radial guide means includes a linear bearing mounted to said carriage and a center pole piece mounted to said frame, said center pole piece serving as a guide rail.

* * * * *